(12) United States Patent
Camp

(10) Patent No.: US 8,118,481 B2
(45) Date of Patent: Feb. 21, 2012

(54) FLUID DETECTOR

(75) Inventor: Philip George Camp, Taunton (GB)

(73) Assignee: General Electric Company, Schenectady, NY (US)

( * ) Notice: Subject to any disclaimer, the term of this patent is extended or adjusted under 35 U.S.C. 154(b) by 698 days.

(21) Appl. No.: 12/205,098

(22) Filed: Sep. 5, 2008

(65) Prior Publication Data

US 2009/0071244 A1    Mar. 19, 2009

(30) Foreign Application Priority Data

Sep. 14, 2007 (EP) .................................... 07116481

(51) Int. Cl.
G01K 13/00 (2006.01)
G01N 25/00 (2006.01)
G01F 1/20 (2006.01)
G01F 1/12 (2006.01)

(52) U.S. Cl. ........... 374/45; 374/147; 374/43; 73/25.01; 73/204.23

(58) Field of Classification Search .................... 374/29, 374/5, 39, 40, 43, 44, 45, 100, 163, 164, 374/183, 185, 208, 141, 135, 147, 148; 73/19.04, 73/23.24, 23.25, 25.01, 861, 861.1, 204.21, 73/204.17, 204.18, 204.11, 202.5, 204.23
See application file for complete search history.

(56) References Cited

U.S. PATENT DOCUMENTS

| | | | | |
|---|---|---|---|---|
| 3,123,086 A | * | 3/1964 | Kleiss | 137/4 |
| 3,672,205 A | * | 6/1972 | Leidenfrost | 374/44 |
| 4,220,039 A | | 9/1980 | Taylor | |
| 4,304,127 A | * | 12/1981 | Feller | 374/41 |
| 4,501,145 A | * | 2/1985 | Boegli et al. | 73/204.17 |
| 4,643,350 A | * | 2/1987 | DeSchaaf et al. | 236/12.12 |
| 4,779,458 A | * | 10/1988 | Mawardi | 374/41 |
| 4,932,788 A | * | 6/1990 | Yeh | 374/35 |
| 5,108,193 A | * | 4/1992 | Furubayashi | 374/164 |
| 5,348,394 A | * | 9/1994 | Hori et al. | 374/44 |
| 5,359,891 A | * | 11/1994 | Yamamoto et al. | 73/204.15 |
| 5,415,024 A | * | 5/1995 | Proffitt et al. | 73/61.44 |
| 5,515,295 A | * | 5/1996 | Wang | 702/45 |
| 5,753,815 A | * | 5/1998 | Murata | 73/204.15 |
| 6,023,969 A | * | 2/2000 | Feller | 73/204.25 |

(Continued)

FOREIGN PATENT DOCUMENTS

EP    0484645    5/1992

(Continued)

Primary Examiner — Gail Verbitsky
(74) Attorney, Agent, or Firm — GE Global Patent Operation; Mark A. Conklin

(57) ABSTRACT

A detector for identifying a fluid is disclosed. The detector comprises a probe having a thermistor, the probe being arranged to be exposed to a fluid and to allow thermal flow between the fluid and the thermistor; a temperature sensor to measure the ambient temperature of the fluid and a controller. The controller is arranged to supply electrical power to the thermistor and to provide an output indicative of the identity of the fluid based upon whether the electrical power supplied to the thermistor is above or below a threshold value. The threshold value is adjustable in accordance with the measured ambient temperature of the fluid. Examples of such a detector provide reliable fluid identification despite variations in ambient temperature of the fluid and such a detector may be compact, inexpensive, reliable and robust.

10 Claims, 5 Drawing Sheets

U.S. PATENT DOCUMENTS

| | | | |
|---|---|---|---|
| 6,681,625 B1 * | 1/2004 | Berkcan et al. | 73/204.23 |
| 7,251,995 B2 * | 8/2007 | Ariyoshi | 73/204.15 |
| 7,367,711 B2 * | 5/2008 | Kawanishi et al. | 374/45 |
| 7,722,813 B2 * | 5/2010 | Inoue et al. | 422/68.1 |
| 7,740,402 B2 * | 6/2010 | Camp | 374/45 |
| 2002/0056318 A1 * | 5/2002 | Kobayashi et al. | 73/204.17 |
| 2006/0108003 A1 * | 5/2006 | Bradford et al. | 137/487.5 |
| 2006/0187999 A1 * | 8/2006 | Kawanishi et al. | 374/43 |

FOREIGN PATENT DOCUMENTS

| | | | |
|---|---|---|---|
| EP | 484645 A * | 5/1992 | |
| EP | 1538438 | 6/2005 | |
| JP | 11237356 | 8/1999 | |
| JP | 2001004422 | 1/2001 | |
| RU | 2262082 C2 * | 10/2005 | |

\* cited by examiner

FLUID DETECTOR

This invention relates to detecting and identifying media, in particular fluids.

The detection and identification of fluids has many applications. For example, domestic heating systems preferably have a detector to sense whether liquid or air is present in the heat exchanger and if liquid is present, whether or not it is flowing which is indicative as to whether the heating system pump is running. Detectors are also employed in many other applications, such as engine coolant systems for vehicles and domestic appliances such as refrigerators, washing machines etc.

A detector for detecting and identifying fluid may comprise a probe including a thermistor. The probe is arranged to be exposed to a fluid and to allow thermal flow between the fluid and the thermistor. The thermistor is preheated by applying electrical power from a heating circuit. When the probe is exposed to fluid, the fluid conducts heat away from the thermistor reducing its temperature. The effective thermal conductivity of fluids such as air, oil, water and moving fluids such as moving water are different from each other. Consequently, the presence of each of these at the surface of the probe can be determined remotely by measuring the reduction in temperature of the thermistor or the increase in electrical power required to keep the thermistor substantially at a predetermined temperature.

However, it has been found that variations in the ambient temperature of the fluid affect the reduction in temperature of the thermistor and increase in power supplied to the thermistor and can lead to erroneous identification of fluids. It would be desirable to be able to reduce the likelihood of these erroneous results.

According to a first aspect of the present invention there is provided a detector for identifying a fluid, the detector comprising a probe having a thermistor, the probe being arranged to be exposed to a fluid and to allow thermal flow between the fluid and the thermistor;

a temperature sensor to measure the ambient temperature of the fluid and a controller to supply electrical power to the thermistor and to provide an output indicative of the identity of the fluid based upon whether the electrical power supplied to the thermistor is above or below a threshold value and wherein the threshold value is adjustable in accordance with the measured ambient temperature of the fluid.

By measuring the ambient temperature of the fluid and adjusting a threshold value used to identify the fluid accordingly, far more reliable fluid identification is achieved. Furthermore, by performing the fluid identification by determining whether the electrical power supplied to the thermistor is above or below a threshold value, which is essentially an analog arrangement, a detector is provided which is more compact, less expensive, more reliable and robust than trying to provide a detector arrangement which would use a micro computer and look-up tables.

The controller may be arranged to supply electrical power to the thermistor to cap or maintain its temperature substantially at a predetermined level.

The controller may be arranged to provide an output to differentiate between two types of fluid based on whether the electrical power supplied to the thermistor is above or below the threshold value. The controller may be arranged to provide an output to differentiate between three types of fluid based on whether the electrical power supplied to the thermistor is above or below each of two threshold values.

According to a second aspect of the present invention, there is provided a method of identifying a fluid, the method comprising exposing a probe including a thermistor to a fluid such that the thermistor is in thermal contact with the fluid;

measuring an electrical parameter indicative of the electrical power supplied to the thermistor;

measuring the ambient temperature of the fluid;

adjusting a threshold value based on the measured ambient temperature of the fluid; and providing an output indicative of the identity of the fluid based upon whether the electrical parameter indicative of the electrical power supplied to the thermistor is above or below the threshold value adjusted in accordance with the measured ambient temperature of the fluid.

Embodiments of the present invention will now be described, by way of example only, with reference to the accompanying drawings, in which:

FIG. 1 schematically illustrates a detector of an embodiment of the present invention;

Figure 1:
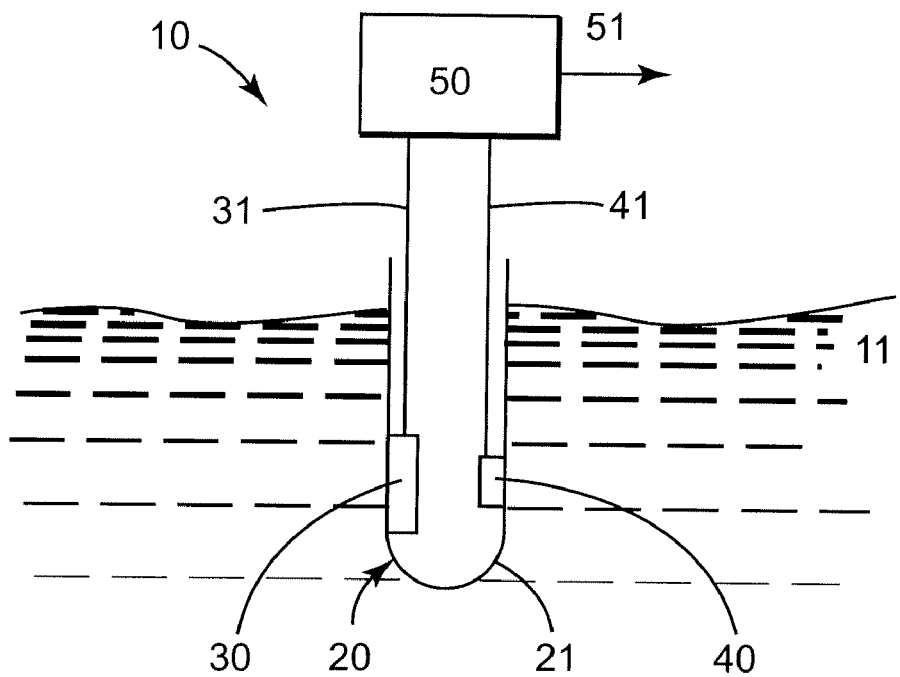

FIG. 1 schematically illustrates a detector 10 of an embodiment of the present invention. The detector 10 comprises a probe 20 arranged to be exposed to a fluid 11. Any suitable fluid may be detected, such as gases, in particular air, and liquids, such as water and oil and/or moving fluids such as flowing air or water which have different thermal capacities when they are moving from when they are static.

The probe 20 includes a thermistor 30. The thermistor 30 is in good thermal contact with the fluid 11 via the outer surface 21 of the probe 20. Any suitable thermistor 30 may be used as is well known to those skilled in the art, provided that its resistance varies with temperature.

A temperature sensor 40 is provided within the probe 20 to measure the ambient temperature of the fluid 11. The thermistor 30 and temperature sensor 40 are mounted within the probe 20 to allow effective thermal flow between the fluid 11 and the thermistor 30 and between the fluid 11 and the temperature sensor 40.

The thermistor 30 and temperature sensor 40 are each electrically connected to a controller 50 via respective electrical connectors 31, 41.

The controller 50 is arranged to supply electrical power to the thermistor 30. The controller 50 is arranged such that electrical power is supplied to the thermistor 30 to cap its temperature at a predetermined level. This predetermined capped temperature is preferably well above the highest ambient temperature that the fluid 11 is likely to reach. When used in a heat exchanger of a domestic heating system, the thermistor 30 may be capped at approximately 100° C. The controller 50 may be arranged to maintain the thermistor 30 substantially at a predetermined temperature such as 100° C. The controller 50 is arranged to provide an output 51 indicative of the identity of the fluid 11 based upon whether the electrical power supplied to the thermistor 30 is above or below a threshold value and wherein the threshold value is adjustable in accordance with the ambient temperature of the fluid 11 measured by temperature sensor 40.

Figure 2:
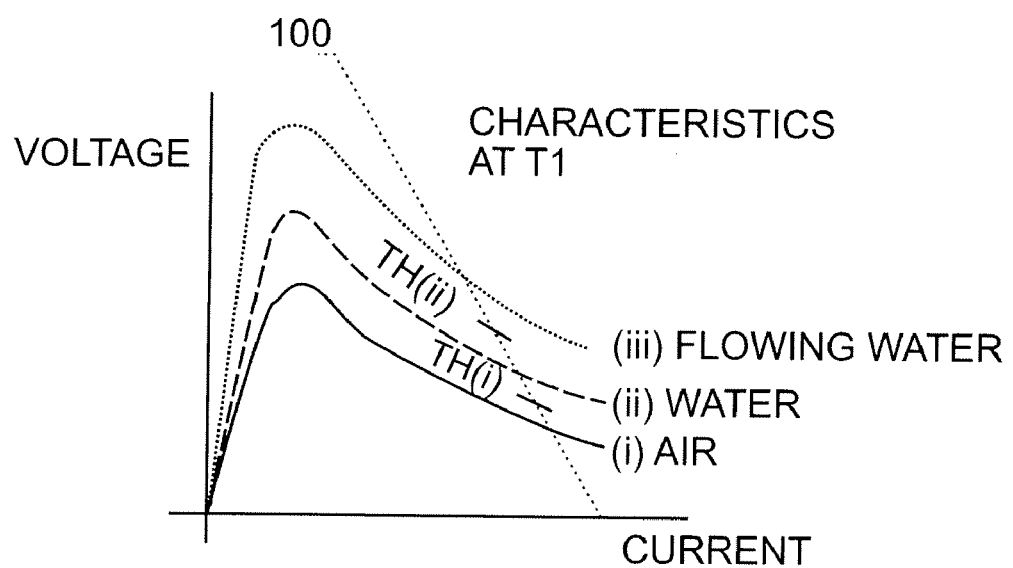
FIG. 2 illustrates voltage/current characteristics of the detector when exposed to each of (i) air, (ii) still water and (iii) flowing water.

FIG. 2 illustrates voltage/current characteristics of the electrical power supplied to the thermistor 30 in a variety of fluids 11, namely (i) still air, (ii) still water and (iii) flowing water, all at the same ambient fluid temperature. The three curves (i), (ii) and (iii) are produced by slowing increasing the voltage and allowing the current to stabilise at each increment.

As can be seen from FIG. 2, each of the different fluids has a clearly distinguishable characteristic (i), (ii) and (iii). When the detector 10 of FIG. 1 is used, the voltage and current supplied to the thermistor 30 by the controller 50 will be at a point along the load line 100 dependent upon the type of fluid in which the probe 20 is provided. The precise position of the load line 100 on the voltage/current characteristic will be dependent upon the characteristics of the device 10 and may vary slightly from device to device due to slight construction or variations. Nevertheless, by monitoring the electrical power or voltage supplied to the thermistor 30 along the load line 100, a determination can be made as to the identity of the fluid 11 in which the probe 20 is provided. As can be seen from the three characteristics of FIG. 2, as air has the lowest thermal conductivity of the three fluids, less power (voltage× current) needs to be supplied to the thermistor 30 by controller 50 to maintain it at the capped temperature, more electrical power needs to be supplied to still water (ii) and yet further electrical power needs to be supplied when the probe is exposed to flowing water (iii) which has the highest thermal conductivity of the three.

As can be seen from FIG. 2, by monitoring the voltage supplied to the thermistor 30 by controller 50 along load line 100, the fluid 11 in which the probe 20 is provided can be determined by whether the supplied voltage is above or below thresholds TH(i) and TH(ii).

Figure 3:
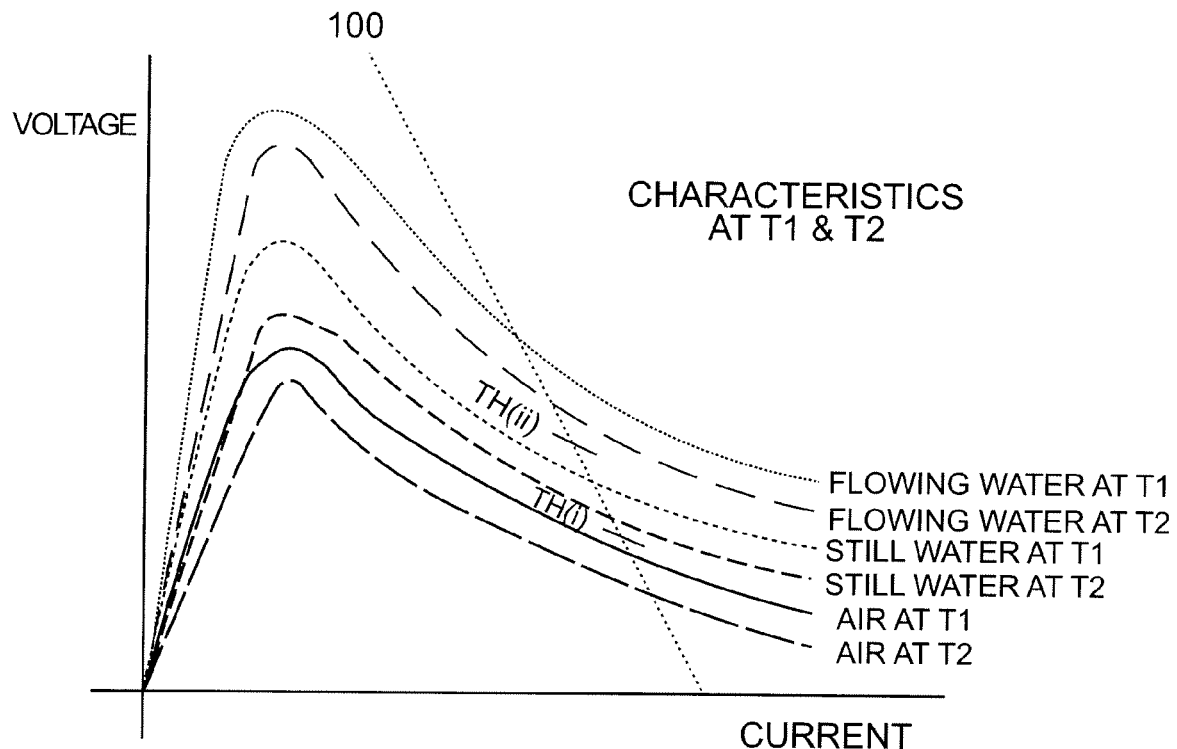
FIG. 3 illustrates voltage/current characteristics of the detector when exposed to each of (i) air, (ii) still water and (iii) flowing water each at two different temperatures T1 and T2.

FIG. 3 illustrates a similar series of voltage/current characteristics for each of air, still water and flowing water except in this example voltage/current characteristics are provided for each at a lower ambient fluid temperature T1 and a higher ambient fluid temperature T2. As can be seen, different types of fluids at a first ambient temperature T1 will draw similar electrical power/voltage as a different fluid at a different ambient temperature T2 such that there is only a small margin of error between the threshold values TH(i) and TH(ii). Thus, with sufficient variations in ambient temperature of the fluid 11, conventional detectors without the features of the present invention could produce erroneous fluid identifications. However, this problem is overcome in embodiments of the present invention by the controller 50 being arranged to adjust the threshold values TH(i), TH(ii) in accordance with the ambient temperature of the fluid 11 measured by temperature sensor 40. Consequently, the detector 10 of embodiments of the present invention provides very reliable fluid identification.

Figure 4:
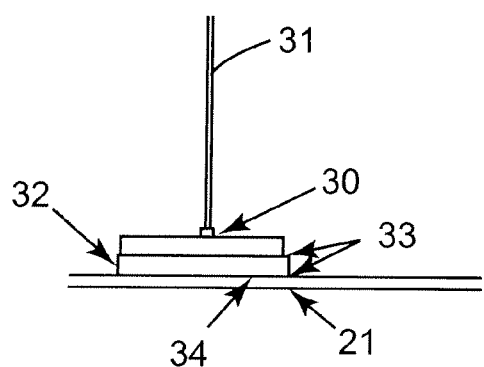
FIG. 4 illustrates a side view of a thermistor provided in a probe.

FIG. 4 shows a side view of the thermistor 30. Any suitable thermistor 30 as is well known in the art may be used. In this example a ceramic thermistor is used. As a ceramic thermistor has a relatively poor thermal conductivity the thermistor 30 preferably has a surface area to thickness ratio of at least 6:1.

The outer surface of the probe 20 is provided by a stainless steel case 21 which isolates the fluid from the sensor elements and allows effective thermal flow through its thickness. A metallised ceramic e.g. $Al_2O_3$ or AlN 32 is provided between the thermistor 30 and stainless steel case 21 to electrically isolate the thermistor 30 from its surroundings and provide a small and consistent temperature gradient between the fluid 11 and thermistor 30. The metallised ceramic layer 32 is soldered 33 to the thermistor 30 and to the stainless steel case 21 via a sputtered solderable thin film layer 34.

Electrical connection between the thermistor 30 and controller 50 is made with a fine thermally resistive wire 31 to prevent unwanted heat loss. The thermistor sub-assembly may be coated with a protective resin.

Figure 5:
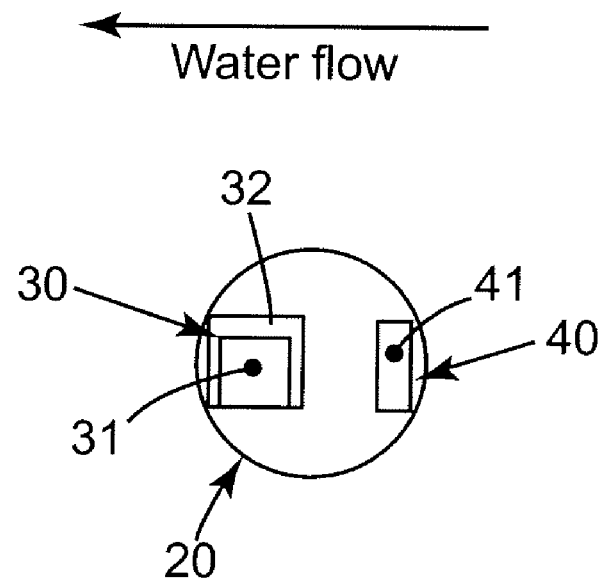
FIG. 5 illustrates a top view of a thermistor and a temperature sensor in a probe.

FIG. 5 shows a top view of a cross section through the probe 20 showing the thermistor 30 and temperature sensor 40. The thermistor 30 and temperature sensor 40 are preferably substantially thermally independent so that heat produced by thermistor 30 does not affect measurements made by temperature sensor 40. Thermal independence may be achieved in many ways, for example by positioning the thermistor 30 and temperature sensor 40 on opposite sides of the probe 20 and, if desired, by providing a thermal barrier between the two.

As shown in FIG. 5, the temperature sensor 40 may also be provided upstream of the thermistor 30 to reduce the likelihood of any heating effects produced by thermistor 30 affecting readings from temperature sensor 40 when used with a flowing fluid.

The temperature sensor 40 may be provided by any suitable element as is well known to those skilled in the art, and in this example is provided by a further thermistor. Like electrical connector 31, electrical connector 41 is preferably also provided by a fine thermally resistive wire.

Figure 6:
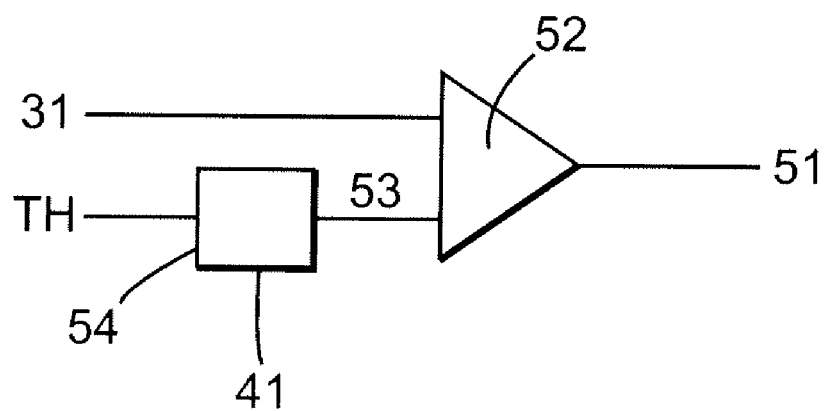
FIG. 6 illustrates a controller of an embodiment of the present invention for distinguishing between two types of fluid.

FIG. 6 schematically illustrates an electronic circuit to provide the function of the controller 50. A comparator 52 is provided with two inputs 31, 53. The first input 31 is indicative of the voltage supplied to the thermistor 30 and the second input 53 is based on a threshold voltage TH previously determined to discriminate between two types of fluids, such as air and still water or still water and flowing water for example. As can be seen, the threshold voltage TH is supplied to a module 54 which also receives an input from ambient fluid temperature sensor 40. The module 54 adjusts the threshold voltage TH in accordance with the ambient temperature of the fluid 11 measured by temperature sensor 40 and supplies the adjusted threshold voltage as the second input 53 to the comparator 52. The comparator 52 compares the voltages on input lines 31, 53 and outputs a voltage on line 51 indicative of whether the voltage supplied to thermistor 30 is above or below the ambient fluid temperature adjusted threshold voltage TH and so is indicative of the identity of the fluid 11.

Figure 7:
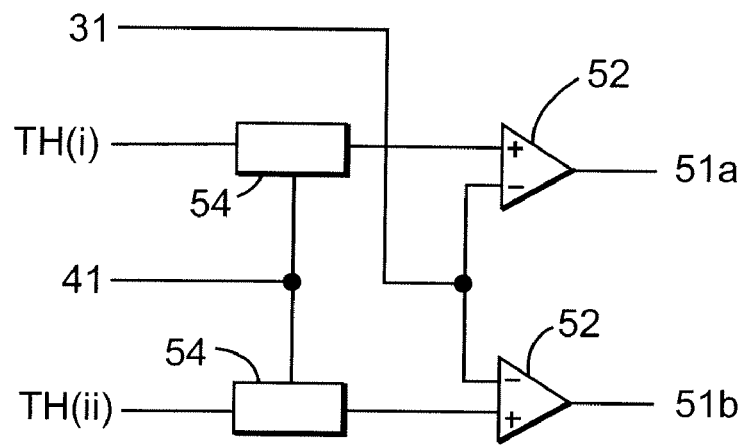
FIG. 7 illustrates a controller of an embodiment of the present invention for distinguishing between three types of fluid.

The arrangement shown in FIG. 6 is able to differentiate between two different types of fluid. In order to differentiate between three different types of fluid the voltage 31 supplied to thermistor 30 is supplied to two comparators 52 each with an appropriate (and different) threshold voltage TH(i), TH(ii) adjustable to take account of ambient fluid temperature 41 in order to differentiate between the three appropriate types of fluid. Such an arrangement is shown in FIG. 7.

Figure 8:
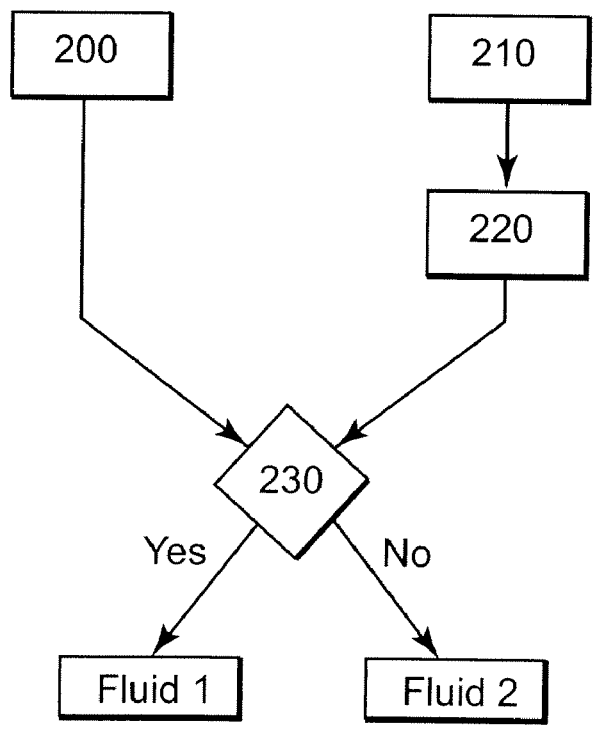
FIG. 8 is a flow diagram illustrating the operation of the controller illustrated in FIG. 6

FIG. 8 illustrates a flow chart of a method of identifying a fluid in which the probe 20 of the detector 10 is provided. At step 200 the electrical power or voltage applied to thermistor 30 is determined. At step 210 the ambient temperature of fluid 11 is measured using temperature sensor 40. At step 220 a threshold voltage used to differentiate between two types of fluids 11 is adjusted based upon the measured ambient fluid temperature. At step 230 the power/voltage applied to thermistor 30 is compared to the ambient fluid temperature adjusted threshold power/voltage and if it is greater then the fluid is identified as a first fluid and if it is less then the ambient temperature adjusted threshold voltage it is identified as a second fluid.

As explained above, the threshold power/voltage is previously determined to be appropriate for differentiating between two types of fluid such as air and still water or still water and flowing water for example. If the detector 10 is arranged to differentiate between three different types of fluids then the method of FIG. 8 is applied twice, each with an appropriate threshold power/voltage to differentiate between two of the three different types of fluid.

Figure 9:
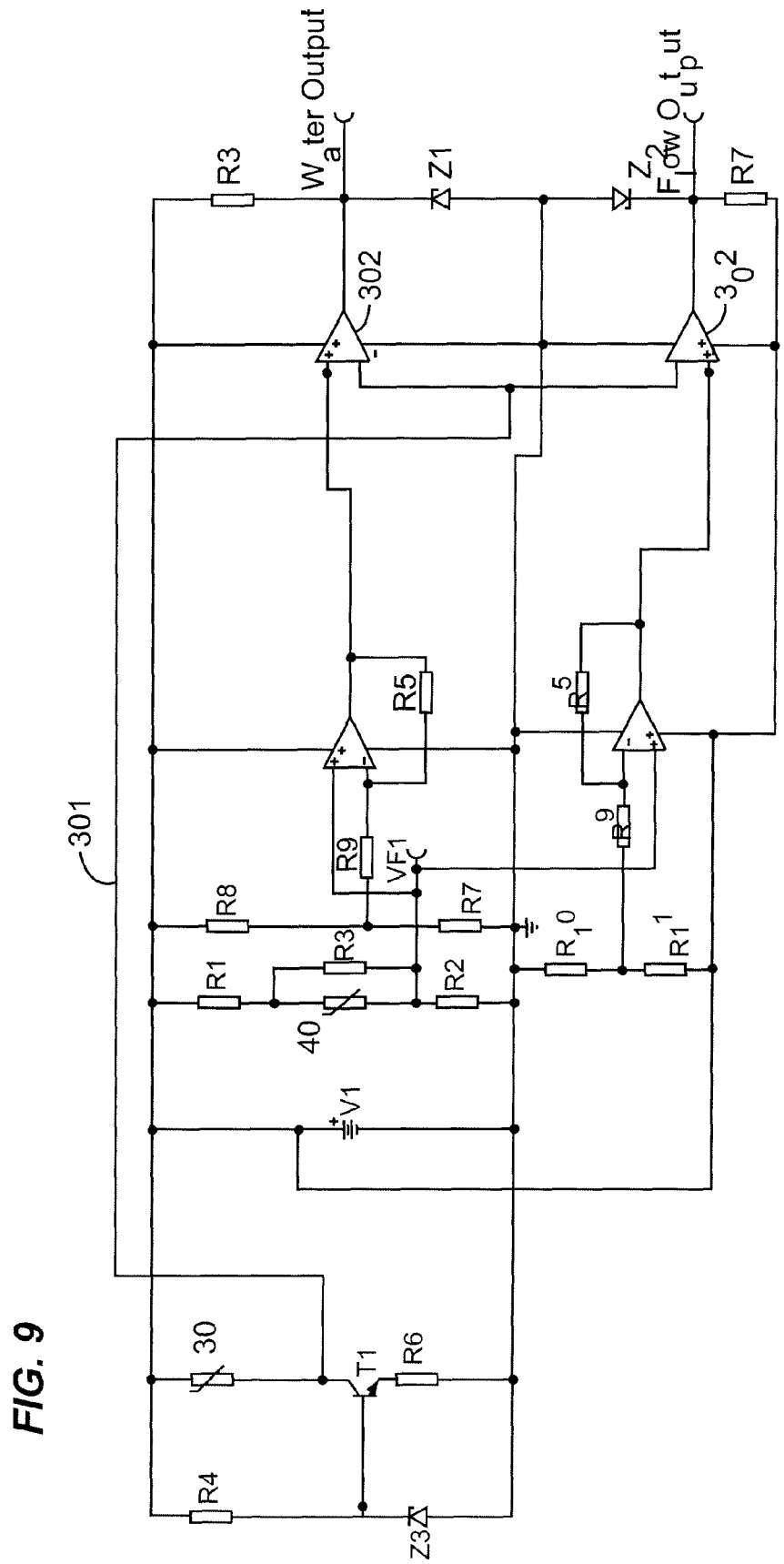
FIG. 9 is a circuit for a more detailed example of a controller circuit embodying the present invention.

FIG. 9 illustrates a more detailed example of a circuit for differentiating between air, still water and moving water. The circuit incorporates resistors, diodes, transistors, thermistors and operational amplifiers, all indicated by their conventional symbols. The values of the electrical components can be selected appropriately by a person skilled in the art for the particular application.

As can be seen from FIG. 9, an output based on thermistor 30 is applied via line 301 to the negative input of each of two comparators 302. The positive inputs to each of the comparators 302 is supplied by an arrangement which provides two different threshold voltages. The actual values of the threshold voltages are selected dependent upon the types of fluids to be differentiated between. The different threshold voltages applied to each of the positive inputs of comparators 302 are adjustable in accordance with the ambient temperature of the fluid 11, an indication of which is provided by thermistor 40.

Many variations may be made to the examples described above whilst still falling within the scope of the present invention. For example, the detector 10 may be able to differentiate between two different types of fluid, three different types of fluid or any number of different types of fluid by providing the appropriate number of threshold values.

The invention claimed is:

1. A detector for identifying a fluid, the detector comprising:
   a probe having a thermistor, the probe being arranged to be exposed to a fluid and to allow thermal flow between the fluid and the thermistor;
   a temperature sensor to measure the ambient temperature of the fluid and
   a controller to supply electrical power to the thermistor and to provide an output indicative of the identity of the fluid based on whether the electrical power supplied to the thermistor is above or below a threshold value and wherein the threshold value is adjustable in accordance with the measured ambient temperature of the fluid.

2. A detector according to claim 1, wherein the controller is arranged to supply electrical power to the thermistor to cap its temperature substantially at a predetermined level.

3. A detector according to claim 1, wherein the controller is arranged to supply electrical power to the thermistor to maintain its temperature substantially at a predetermined level.

4. A detector according to any one of the preceding claims, wherein the controller is arranged to provide an output to differentiate between two types of fluid based on whether the electrical power supplied to the thermistor is above or below the threshold value.

5. A detector according to any one of claim 1, wherein the controller is arranged to provide an output to differentiate between three types of fluid based on whether the electrical power supplied to the thermistor is above or below each of two threshold values.

6. A detector according to claim 1, wherein the electrical power supplied to the thermistor is determined by monitoring a voltage supplied to the thermistor which is compared to a threshold voltage.

7. A method of identifying a fluid, the method comprising exposing a probe including a thermistor to a fluid such that the thermistor is in thermal contact with the fluid;
   measuring an electrical parameter indicative of the electrical power supplied to the thermistor;
   measuring the ambient temperature of the fluid;
   adjusting a threshold electrical parameter value based on the measured ambient temperature of the fluid; and
   providing an output indicative of the identity of the fluid based upon whether the electrical parameter indicative of the electrical power supplied to the thermistor is above or below the threshold value adjusted in accordance with the measured ambient temperature of the fluid.

8. The method according to claim 7, wherein electrical power is supplied to the thermistor to cap its temperature substantially at a predetermined level.

9. A method according to claim 7, wherein electrical power is supplied to the thermistor to maintain its temperature substantially at a predetermined level.

10. A method according to claim 7, wherein an output indicative of the identity of the fluid is provided based upon whether the electrical parameter indicative of the electrical power supplied to the thermistor is above or below two threshold values, each adjusted in accordance with the measured ambient temperature of the fluid.

* * * * *